July 2, 1957 H. D. BRAILSFORD 2,798,191
SENSITIVE PRESSURE MEASURING SERVOSYSTEM
Filed Feb. 10, 1953
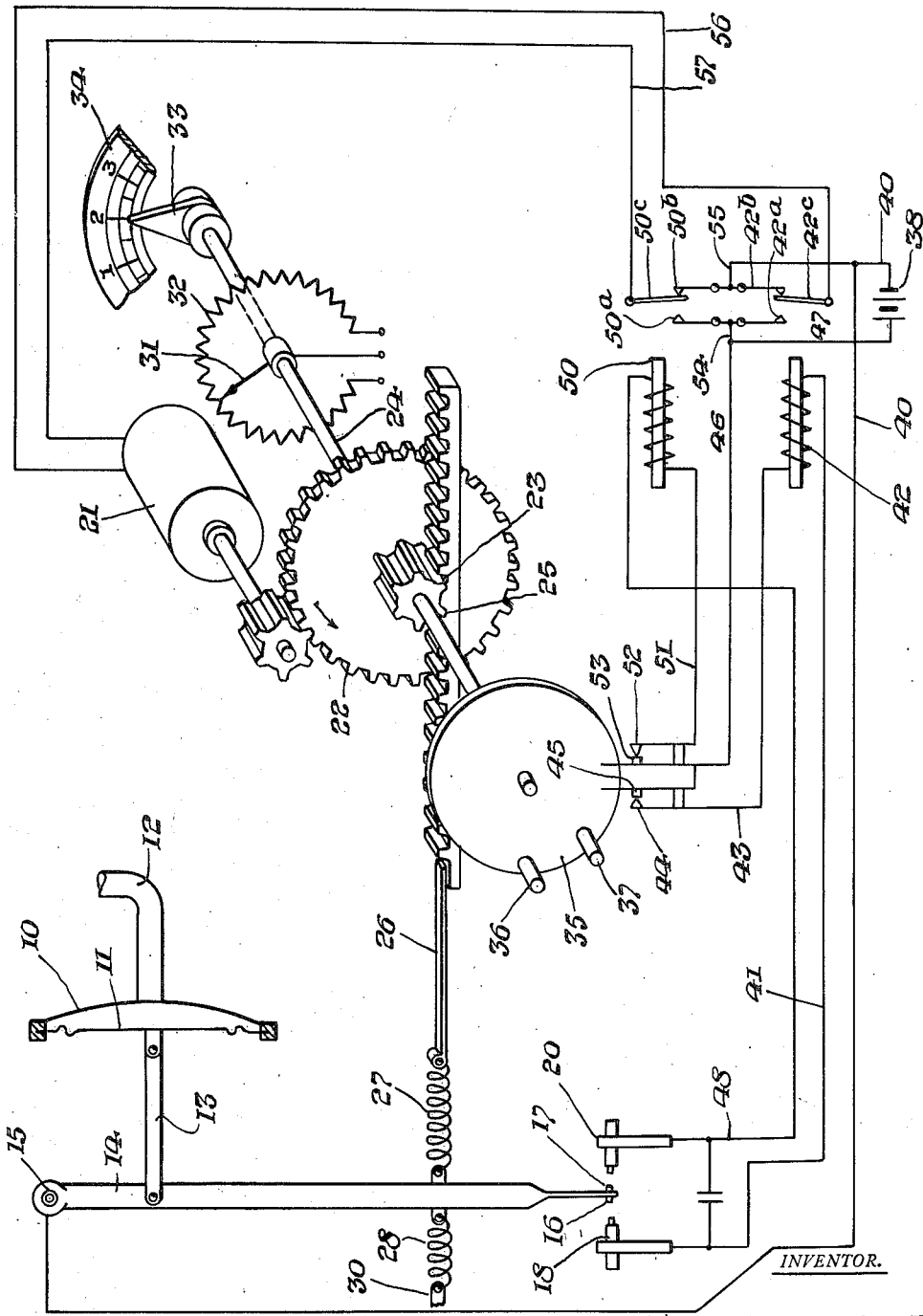
INVENTOR.
Harrison D. Brailsford
BY Darby & Darby
ATTORNEYS.

United States Patent Office 2,798,191
Patented July 2, 1957

2,798,191

SENSITIVE PRESSURE MEASURING SERVOSYSTEM

Harrison D. Brailsford, Rye, N. Y.

Application February 10, 1953, Serial No. 336,103

5 Claims. (Cl. 318—32)

The present invention relates to the measurement of pressures and particularly to the telemetering of pressures.

More particularly still the invention relates to the accurate measurement of pressure and the indication of pressure when the pressure differences are very slight. The instrument of the present invention is compact and portable and thus provides a means for the measurement of small pressure differences which may be utilized in many situations where a bulky instrument could not be utilized.

It is an object of the invention to provide a sensitive instrument for measuring and indicating both locally and at a distance minute differences in pressure.

It is another object of the invention to provide such a pressure measuring instrument which is compact and readily portable.

It is a further object of the invention to provide a sensitive pressure measuring instrument which is readily adjusted to a desired range of measurement and which may be economically manufactured.

Other objects and features of the invention will be apparent when the following description is considered in connection with the annexed drawing, in which:

The single figure of the drawings is a diagrammatic view showing the instrument of my invention together with the electrical wiring thereof.

Referring now to the drawing there is shown at 10 a chamber having a flexible diaphragm 11 stretched across an open end thereof and having an inlet tube 12 fixed in the opposite side of the housing.

The diaphragm 11 has pivoted to the center point thereof a link 13 which link is pivoted at its opposite end to a lever 14. Lever 14 is pivoted at point 15 and the opposite end of the lever is provided with a pair of contacts 16 and 17 the contacts being located between a pair of fixed contacts 18 and 20.

The contacts 18 and 20 thus serve to limit movement of the lever arm 14 from its null or centered position. It is to be noted that the air gaps between contacts 16 and 18 and 17 and 20 are exaggerated in the drawing and would be extremely small in practice.

A reversible electric motor 21 is provided which, through a gear 22 and pinion 23 both mounted on a shaft 24, drives a rack 25. Rack 25 is connected by means of the link 26 and the spring 27 to the lever arm 14. Opposite the point of connection of the spring 27 to the lever arm 14 another spring 28 is stretched between the lever arm and a fixed portion of the mechanism indicated at 30.

Mounted on shaft 24 is a contact arm 31 which cooperates with a rheostat 32 and provides the means of indicating the pressure in the inlet pipe 12 at a distance. Also mounted on the shaft 24 is an indicator hand 33 which cooperates with the scale 34 to indicate the pressure in the pipe 12. Furthermore, there is mounted on the shaft 24 a disk 35 carrying two pins 36 and 37 which pins cooperate with certain contacts to be hereinafter described to limit the range of movement of the motor 21 and the various parts hereinabove described which are driven thereby.

The electrical elements of the device comprise a battery 38 the negative terminal of which is connected by means of conductor 40 to the lever arm 14 and thus to the two contacts 16 and 17. Fixed contact 18 is connected by means of conductor 41 to the winding of a relay 42, the circuit then extending over conductor 43 to contact 44 and, when the contact 44 makes with the cooperating contact 45 through conductors 46 and 47 to the positive side of the battery 38.

In like manner fixed contact 20 is connected by means of a conductor 48 to the winding of relay 50, the circuit then extending through conductor 51 to contact 52. When contact 52 is closed against contact 53 the circuit is extended over conductors 46 and 47 to the positive side of the battery 38.

Each of the relays 42 and 50 is provided with a pair of contacts, these pairs being designated 42a, 42b and 50a, 50b, respectively. Each relay 42 and 50 is also provided with an armature, the two armatures being designated 42c and 50c. Contacts 42a and 50a are joined together and by means of conductors 54 and 47 connected to the positive terminal of battery 38. Contacts 42b and 50b are likewise connected together and are joined by conductors 55 and 40 to the negative terminal of battery 38. The armature 42c of relay 42 is connected by means of conductor 56 to one side of the winding of the motor 21 and the armature 50c of relay 50 is connected by means of conductor 57 to the other side of the winding of motor 21.

When the lever arm 14 is in the position indicated in the drawing, the relay armatures 42c and 50c are both connected to the negative pole of battery 38. Since the relay contacts 42a and 50a are connected to the positive pole of battery 50, it is clear that when either relay 42 or 50 is operated a circuit will be completed from the positive pole of battery 38 through the operated one of the contacts 42a, 50a and the corresponding armature and thence through the motor winding returning to the negative pole of the battery through the unoperated armature 42c or 50c. This operation of relay 42 or 50 will occur when the pressure in the inlet pipe 12 and thus in the chamber 10 is either increased or decreased. If the pressure is increased the relay 42 will be energized whereas, if it is decreased, the relay 50 will be energized. As shown in the drawing the shaft of the motor 21 is seen to turn in a clockwise direction when relay 42 is energized and in a counterclockwise direction when relay 50 is energized. In the at rest position indicated in the drawing it is assumed that the lateral tension exerted on the lever arm 14 by the spring 27 is balanced by the tension exerted on the lever 14 in the opposite direction by the zeroing spring 28 and the link 13 thus holding the contact points 16, 17 centered between fixed contacts 18 and 20.

When the pressure in the inlet tube 12 rises a force will be exerted on the lever arm 14 tending to rotate it to the left. This force will cause the contact 16 to engage the contact 17 and therefore energize the relay 42 over circuits fully described above. The energization of relay 42 will result in a clockwise rotation of the shaft of motor 21 resulting in a counterclockwise rotation of the gear 22 and pinion 23 and of course of the shaft 24 on which the gear and pinion are fixed. As a result the rack 25 will move to the right thus increasing the tension exerted on the lever arm 14 by the calibrated spring 27. The tensioning of spring 27 will continue to increase until the force it exerts on the lever arm 14 compensates for the force impressed upon that lever by the diaphragm 11 at which time the lever arm will return to its balanced or centered position, thereby breaking the circuit to relay 42 and opening the circuit to motor 21.

If the pressure in the inlet tube 31 decreases a force to the right will develop on the diaphragm 11 and thus on the lever arm 14. The balance of forces holding the lever arm 14 in its center position will be upset and the lever arm will swing to the right causing contact to be made between the contact 17 and contact 20. This, as has been described, will result in energization of relay 50 thereby causing the shaft of motor 21 to revolve in a counterclockwise direction moving the rack 25 to the left. Motion of the rack to the left will decrease the tension exerted by the spring 27 on the lever arm 14 until the motion compensates for the force then transmitted to the lever arm 14 from the diaphragm 11. At this time the lever arm 14 will return to the center position breaking the circuit at contacts 17, 20 and de-energizing relay 50 which results in de-energizing motor 21.

It will be obvious that at each movement of the rack 25 the shaft 24 and of course the potentiometer rheostat contact 31 and indicating hand 33 are displaced from their original position. The arcuate displacement of the contact arm 31 and the indicator hand 33 is proportional to the amount of increased or decreased tension required in spring 27 to overcome the unbalancing force originating at the diaphragm 11 and therefore the displacement of these parts are functions of the change in pressure of the diaphragm.

It is clear that by properly calibrating a dial 34 and a similar dial which is driven by a motor in the circuit of the rheostat 32 in accordance with known pressure differentials the device will give an accurate indication of pressure changes existing in the inlet pipe 12.

Due to the mechanical construction heretofore described the range of the instrument is limited to a rotation of approximately 300° of the shaft 24, this being dictated primarily by the arcuate extent of permissible movement of the potentiometer sliding contactor 31. In order to limit the shaft 24 to this travel, limiting switches comprising the pins 36 and 37 cooperating with contacts 44, 45, 52 and 53 are provided. When the instrument reaches the high pressure limit the shaft 24 rotating in a counterclockwise direction brings the switch actuating pin or stud 37 against the extended portion of contact 45 thus opening the circuit to relay 50. This results in the stoppage of motor 21 which can no longer operate in a clockwise direction. The shaft 24 is free, however, to operate in the low pressure direction.

In a similar manner when the instrument reaches the low pressure limit which results from shaft 24 and disk 35 turning in a clockwise direction, the stud or pin 36 makes contact with the extension of contact 53 de-energizing relay 42 and preventing operation in this direction.

It will be noted that when both relays 42 and 50 are de-energized and the relay armatures in the position shown in the drawing, the motor windings are shorted through contacts 42b and 50b resulting in immediate stoppage of the motor which contributes a damping effect and eliminates any tendency of the instrument to self-oscillation or excessive hunting.

While I have described preferred embodiments of my invention, it will be understood that many modifications may be made within the scope thereof. Consequently, I wish to be limited not by the foregoing description but solely by the claims granted to me.

What is claimed is:

1. A sensitive pressure measuring instrument comprising, in combination, a chamber closed by a diaphragm, an inlet for admitting pressure fluid to said chamber, a contact arm, means pivotally mounting said contact arm at one end thereof, a pair of contacts fixed in position at opposite sides of said arm at the end opposite said pivotal mounting, contacts on said arm cooperating with said fixed contacts, a link connecting said diaphragm to said arm intermediate said pivotal mounting and said contacts, a spring fixed to said arm and urging said arm toward one of said fixed contacts against the urge of said link, and means to adjust the tension of said spring to retain said arm in centered position between said fixed contacts, said tension adjusting means comprising a rack connected to the opposite end of said spring, gear means driving said rack, and a reversible motor energized when said arm moves against one of said fixed contacts to adjust said spring tension and return said arm to its centered position between said contacts.

2. A sensitive pressure measuring instrument as claimed in claim 1, characterized in that a relay winding is connected in circuit with each of said fixed contacts, the contacts of one of said relays being connected to said motor to operate said motor in one direction, the contacts of the other of said relays being connected in said motor circuit to operate said motor in the opposite direction, said relay contacts cooperating when said relays are both deenergized to short circuit the motor winding and thereby prevent overrun of said motor and hunting of said contacts.

3. A sensitive pressure measuring instrument as claimed in claim 2, characterized in that said motor drives a disk, said disk having pins thereon, said pins cooperating with switch elements connected in the supply circuit for said motor and said contacts to limit the travel of said rack in both directions.

4. A sensitive pressure measuring instrument as claimed in claim 2 in which said relay contacts of each of said relays comprise first and second fixed contacts and a movable contact biased against one of said fixed contacts, said first fixed contacts of both said relays being connected together and said second fixed contacts of said relays being connected together and said movable contacts of said relays being connected to opposite ends of said motor winding, a source of electric power connected between said first and second fixed contacts of said relays, said motor winding being energized from said source of power when only one of said relays is energized and being short circuited when both said relays are energized and when both said relays are de-energized.

5. A sensitive pressure measuring instrument comprising, in combination, a chamber closed by a diaphragm, an inlet for admitting pressure fluid to said chamber, a contact arm, means pivotally mounting said contact arm, a pair of contacts located on opposite sides of said arm at the end thereof remote from said pivotal mounting, contacts on said arm cooperating with said first-named contacts, a link connecting said diaphragm to said arm to rotate said arm about said pivotal mounting in response to movement of said diaphragm, a spring affixed to said arm and urging said arm toward one of said contacts against the urge of said link, a rack connected to the opposite end of said spring, gear means driving said rack, a reversible motor, a relay winding connected in circuit with each of said first-named contacts, each of said relays having relay contacts, the contacts of one of said relays being connected to said motor to operate said motor in one direction, the contacts of the other of said relays being connected to said motor to operate said motor in the opposite direction accordingly as said relays are energized when said arm moves against one of said first-named contacts, said motor being connected to said rack to adjust said spring tension and return said arm to its centered position between said first-named contacts, said relay contacts cooperating when said relays are both de-energized to short circuit the motor winding and thereby prevent overrun of said motor and hunting of said first-named contacts.

References Cited in the file of this patent

UNITED STATES PATENTS

| | | | |
|---|---|---|---|
| 1,658,577 | Smoot | Feb. 7, | 1928 |
| 1,855,205 | Schur | Apr. 26, | 1932 |
| 2,123,725 | Handwerk | July 12, | 1938 |
| 2,331,871 | Tate | Oct. 9, | 1943 |
| 2,568,586 | Hunt et al. | Sept. 18, | 1951 |
| 2,599,288 | Schafer | June 3, | 1952 |
| 2,629,259 | Corbin | Feb. 24, | 1953 |
| 2,731,831 | Shaefer | Jan. 24, | 1956 |